Nov. 17, 1970 W. H. BEALL 3,541,320

DRIFT COMPENSATION FOR INTEGRATING AMPLIFIERS

Filed Aug. 7, 1968 2 Sheets-Sheet 1

INVENTOR
WILLIAM H. BEALL

BY George A. Herbster

ATTORNEY

DRIFT COMPENSATION FOR INTEGRATING AMPLIFIERS

Filed Aug. 7, 1968

2 Sheets-Sheet 2

INVENTOR
WILLIAM H. BEALL

BY George A. Webster

ATTORNEY

United States Patent Office 3,541,320
Patented Nov. 17, 1970

3,541,320

DRIFT COMPENSATION FOR INTEGRATING AMPLIFIERS

William H. Beall, Palo Alto, Calif., assignor to General Electric Company, a corporation of New York

Filed Aug. 7, 1968, Ser. No. 750,882
Int. Cl. G06g *7/18;* H03f *1/02*
U.S. Cl. 235—183 5 Claims

ABSTRACT OF THE DISCLOSURE

Drift compensation means for integrating circuits utilizing input and integrating operational amplifiers. During standby operation, an input to the integrating amplifier is disconnected. If the integrating amplifier output drifts from a reference voltage, a compensating voltage returns the output to the reference voltage level. The input amplifier feedback capacitor is switched to store a second compensating voltage during standby operation. This voltage is applied to the input amplifier during amplification to compensate for any offset voltage.

BACKGROUND OF THE INVENTION

This invention is generally directed to integrating operational amplifiers and more specifically to operational amplifiers adapted for use in analog-to-digital converters.

One undesirable parameter encountered in operational amplifiers is an offset voltage which can vary over a considerable range. In certain circuits such amplifiers can serve either as standard amplifiers or, with proper feedback, as integrating amplifiers. In either application, an internally generated offset voltage produces an output offset voltage from the standard amplifier or an output voltage drift over a time period at the output of an integrating amplifier.

In supervisory control systems of the scanning type it is often necessary to monitor an analog function and convert it to a digital output. The analog function is measured at a remote station, converted into digital format at that station and then transmitted over a common communications link to a master station where it is processed and utilized or displayed. As a plurality of points are usually monitored in such a scanning system, the analog point is only interrogated occasionally. Such systems may incorporate standard and integrating amplifiers which utilize operational amplifiers. During standby periods internal or external offset voltage can cause excessive output drift either by applying a constant voltage to the input of the integrating amplifier from a standard input amplifier or, through feedback, from the integrating amplifier output. Accuracy of the conversion to the digital format is thereby adversely affected. In the prior art low-cost operational amplifiers have introduced unacceptable offset voltages. Therefore, requirements for low-drift, low-offset voltage operational amplifiers have been met by the use of expensive operational amplifiers.

Therefore, it is an obect of this invention to provide an integrating circuit in which the output is maintained near zero during non-integrating modes.

Another object of this invention is to provide an integrating amplifier including compensation means for minimizing output voltage drift.

Still another object of this invention is to provide an integrating amplifier which is adapted to incorporate low-cost components.

Yet still another object of this invention is to provide an integrating circuit adapted to use low-cost operational amplifiers for accurate analog-to-digital conversion.

SUMMARY

In accordance with this invention an integrating operational amplifier is disconnected from an input signal during a non-integrating mode. When output voltage excursions occur, a compensating voltage is applied to the input to drive the integrating amplifier output toward zero. Therefore, the output oscillates about the zero point to substantially eliminate adverse drift effects.

A more thorough understanding of the above and further objects and advantages of this invention may be obtained by referring to the following detailed description taken in conjunction with the accompanying drawings.

DESCRIPTION OF AN ILLUSTRATIVE EMBODIMENT

Figure 1:
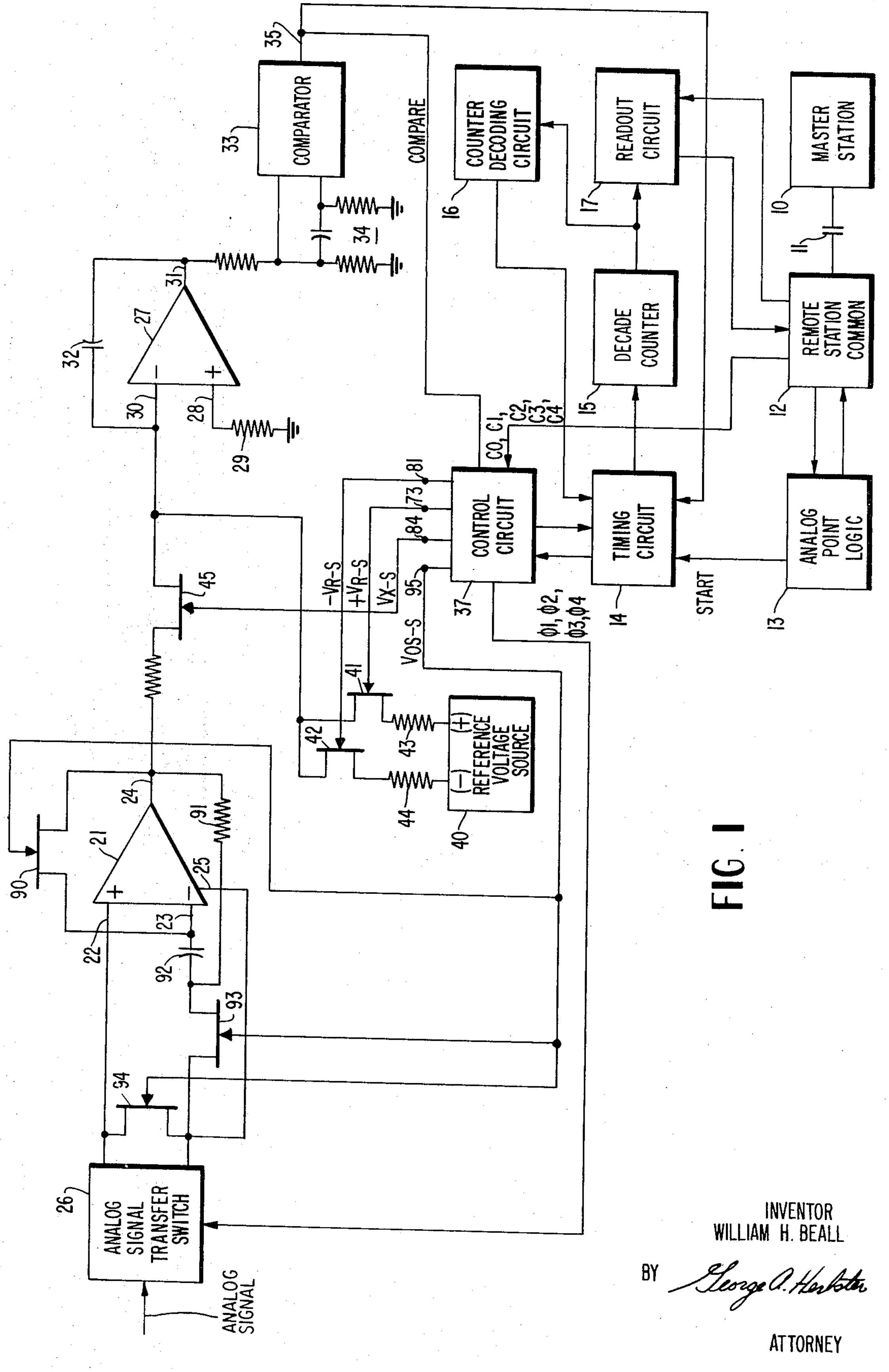
FIG. 1 is a schematic of a compensation circuit constructed in accordance with this invention and especially adapted for a supervisory control system analog-to-digital converter.

This invention is applicable to any integrator using operational amplifiers having normally unacceptable drift rates caused by internally generated offset voltages or extraneous external voltages. However, the particular embodiment shown in the figures serves as a vehicle for explanation. All the advantages and ramifications of such a compensation scheme will be evident once this particular embodiment is understood. In FIG. 1 the invention is applied to an analog-to-digital converter especially adapted for use in a supervisory control system. In such a system, a remote point is to measure an analog value and return the value to a master station upon command as digital information. This analog-to-digital conversion may include an integration technique. For further purposes of explanation it is assumed that an "up-down" integration technique is utilized as described in Schmid, "Digital Meters for Under $100," Electronics, p. 88 (Nov. 28, 1966).

A master station 10 scans a plurality of remote stations through a communications link 11. Each remote station includes a remote station common 12 which is used to control the scanning at that particular remote station. A number of remote points are associated with each remote station and its common 12 so that the circuitry in FIG. 1 is illustrative of a single point at a single remote station in a supervisory system.

The master station 10 sends out a binary message which is received and processed by an appropriate remote station. If properly interrogated, the addressed remote station sends a signal to analog point logic 13 which will further process the message to initiate a START signal which is transferred to a timing circuit 14 to energize the sequence for converting an ANALOG SIGNAL to a digital output. The timing circuit 14 includes a clock and synchronizing circuits so that various time phases are defined. For example, in the up-down technique, four phases are defined during the operating mode although only four phases two and three are actually used for interogation. The phases may be defined as:

Phase 1 ($\phi 1$)—the circuit is prepared for integration;
Phase 2 ($\phi 2$)—the ANALOG SIGNAL is integrated for a fixed time period defined by a counter decoder circuit 16;
Phase 3 ($\phi 3$)—a reference voltage is applied to the integrator to return the output to zero with the return time being measured; and
Phase 4 ($\phi 4$)—the return time is read out.

The return time is read out through a decade counter 15 along with a readout circuit 17 as a plurality of characters under control of the remote station common 12. The remote station common 12 also defines time periods C0 through C4 for reading out the decade counter 15. The readout circuit 17 transmits the count to the remote station common 12 to be transmitted through the communications link 11 to the master station 10.

In FIG. 1 an input amplifier 21 includes an input 22, an inverting input 23, an output 24 and an amplifier common 25. The ANALOG SIGNAL from the addressed remote station is applied to the input 22 through an analog signal transfer switch 26 when conversion is required. The amplified analog signal at the output 24 is coupled to an integrating amplifier 27 which includes an input 28 grounded through a resistor 29, an inverting input 30 and an output 31. Necessary feedback is provided by coupling a capacitor 32 between the output 31 and the inverting input 30. The up-down integration technique is implemented by energizing a comparator 33 with the output voltage from the integrating amplifier 27 through a resistor-capacitor network 34. The comparator 33 produces a digital signal at the output 35, COMPARE, which is a logic 1 when the input thereto is positive and logic 0 when the input is negative. During integration a change in COMPARE signifies the end of phase three. When COMPARE is logic 1 or 0, a control circuit 37 is energized to thereby cause a current input to be applied to the inverting input 30 from a reference voltage source 40 having positive and negative outputs. Signals from the control circuit are coupled to field effect transistors (hereinafter FET's) 41 and 42 which are coupled from the inverting input 30 to the reference voltage source 40 through resistors 43 and 44. The resistors 43 and 44 convert the voltage signal from the reference voltage source 40 to a current input for the integrating amplifier 27. Both the input and integrating amplifiers 21 and 27 generate an internal offset voltage which, if not corrected, could cause an errant analog-to-digital conversion.

Figure 2:
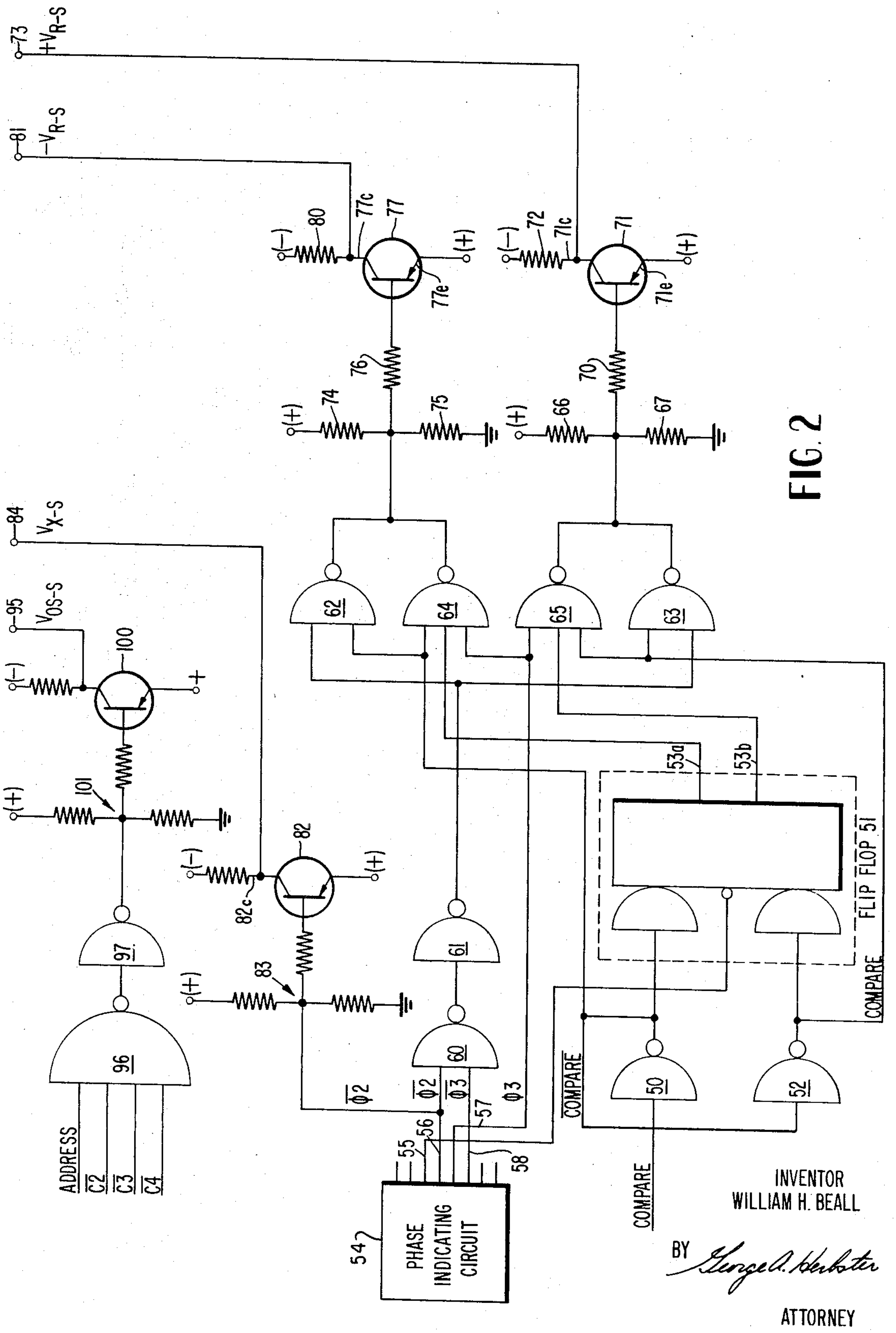
FIG. 2 is a detailed schematic of certain portions of the circuit shown in FIG. 1.

To compensate for these offset voltages, the control circuit 37 is connected to the timing circuit 14 to sense integrating phases one and four. During those times and during the standby operating mode when the analog-to-digital converter is not being interrogated, the control circuit 37 is in a compensating mode to maintain the output of the integrating amplifier 27 near zero. Certain details of the control circuit 37 and its connection in the circuit shown in FIG. 1 are illustrated in FIG. 2. The comparator circuit output, COMPARE, is applied through an inverter 50 to a flip-flop circuit 51 and to an inverter 52. The flip-flop circuit 51 is only utilized during phase three, however. It is illustrated to show its relationship with common portions of the compensating circuit. Therefore, two signals, COMPARE and $\overline{\text{COMPARE}}$, are generated by the inverters 50 and 52.

The timing circuit 14 in FIG. 1 also contains a phase indicating network 54 which includes a plurality of outputs as shown in FIG. 2. Four outputs, 55, 56, 57 and 58, provide binary indications of $\phi 2$, $\overline{\phi 2}$, $\phi 3$, and $\overline{\phi 3}$ respectively. The $\phi 2$ signal is coupled to a timing input on the flip-flop 51. The $\overline{\phi 2}$ and $\overline{\phi 3}$ signals from the terminals 56 and 58 are connected through a NAND circuit 60 to an inverter 61. Hence, in logic, the signal appearing at the output of the inverter 61 is $(\overline{\phi 2}\cdot\overline{\phi 3})$ or $(\overline{\phi 2+\phi 3})$. This signal constitutes one input to each of two NAND circuits 62 and 63. The other input to the NAND circuits 62 and 63 are $\overline{\text{COMPARE}}$ and COMPARE respectively. Two other NAND circuits 64 and 65 are used in the circuit during integration. The outputs of the NAND circuits 62 and 64 are interconnected as are the outputs of the NAND circuits 63 and 65. If each input to one NAND circuit (e.g., NAND circuit 62 or 64) is energized with a logic 1, the combined output will be a logic 0. Both NAND circuits must be energized to produce logic 1 outputs if the combined output is to be a logic 1. One input to the NAND circuits 64 and 65 is from the $\phi 3$ terminal 57. Except during phase three those inputs are at logic 0 so both NAND circuits 64 and 65 tend to go to logic 1 during compensation and are inactive. During compensation the output from the flip-flop circuit 51 does not affect the output from the NAND circuits 64 and 65.

Therefore, if the analog-to-digital converter is not in an actual integrating mode (i.e., $\overline{\phi 2}\cdot\overline{\phi 3}$) the terminals 56 and 58 generate logic 1 signals which are applied as logic 1 inputs to the NAND circuits 62 and 63. If the output of the integrating amplifier 27 in FIG. 1 is positive, the COMPARE signal is logic 1 and is applied to the NAND circuit 50 to produce a logic 0 input for the NAND circuit 62 and a logic 1 input for the NAND circuit 63. NAND circuit 63 goes to logic 0 while NAND circuit 62 remains at logic 1. If the output voltage from the integrating amplifier goes negative, COMPARE goes to logic 0 and $\overline{\text{COMPARE}}$, to logic 1. In this case NAND circuit 62 would cause the combined outputs of NAND circuits 62 and 64 to go to logic 0.

In this specific embodiment logic 0 is taken to be a ground voltage; and logic 1, a positive voltage. During positive voltage excursions, the combined output of NAND circuits 63 and 65, logic 0, is coupled through a resistive voltage divider comprising resistors 66, 67, and 70 to the base electrode of an NPN transistor 71. The resistors 66 and 67 are coupled from a positive voltage to ground. Together with the resistor 70 they produce a ground voltage at the base electrode when the input is at logic 0 and a positive voltage, which reverse biases the emitter-base junction when the input is at logic 1. The emitter electrode **71*e* is coupled to a positive voltage while the collector 71*c* is coupled through a resistor 72 to a negative voltage. The collector voltage, designated as $+V_{R-S}$ is coupled to a terminal 73 which is connected to a gate electrode of the FET 41 in FIG. 1. A similar circuit includes resistors 74 and 75 connected between a positive voltage source and ground with the junction therebetwen coupled to the combined output of the NAND circuits 62 and 64 and through a resistor 76 to the base electrode of another NPN transistor 77. Its emitter 77*e* is connected to a positive voltage source; its collector 77*c*, to a negative voltage source through a resistor 80. The collector voltage, $-V_{R-S}$, appears on a terminal 81. When the output voltage on the integrating amplifier 27 goes positive, the terminal 73 goes positive. Terminal 81** is positive when the output voltage is negative.

Now referring to FIG. 1, when the terminal 73 is positive, FET 41 is forward biased. A positive current input is applied to the inverting input 30 from the reference voltage source 40 through the resistor 43 and the FET 41. This positive current input drives the output in a negative direction until it crosses zero. If the comparator gain is sufficiently great and its offset reasonably small, COMPARE will shift to logic 0 and produce a positive voltage at the terminal 81 substantially with the zero crossing of the integrator output. The terminal 81 is connected to the gate electrode of the FET 42. Negative deviation of the integrator output at the terminal 31 energizes the inverting input 30 with a negative current signal from the reference voltage source 40 through the resistor 44 and the FET 42 to shift the output in the positive direction. This continues until a positive voltage appears on the output 31 whereupon the compensating action reverses. Therefore, the output voltage from the operational amplifier 27 oscillates about zero during compensation. Proper control of the gain or sensitivity of the comparator 33 permits satisfactory drift characteristics to be attained which approximate those of more expensive operational amplifiers.

Conduction of the ANALOG SIGNAL to the operational amplifier 27 is controlled by the FET 45 and the control circuit 37. By maintaining the FET 45 nonconductive except during phase two, output deviations caused by extraneous external signals are reduced. The details of this circuit are also shown in FIG. 2 where the $\overline{\phi 2}$ signal on the terminal 56 is coupled to an NPN transistor 82 by a voltage divider 83 generally similar to the voltage divider associated with the transistors 71 and 77. Therefore, the transistor 82 is conductive during phases one, three, and four. An output signal, $V_{X-S}$, is coupled from the collector 82*c* to a terminal 84 which is slightly positive during phases one, three, and four. It is driven negative during phase two. The terminal 84 is also shown in FIG. 1 and is connected to the gate electrode of the FET 45. A slightly positive voltage on the gate electrode turns on the FET 45 to couple the amplifier ANALOG SIGNAL to the operational amplifier 27. During phases one, three, and four, the FET 45 is non-conductive. No signal from the input amplifier 21 may be applied to the inverting input 30 during these phases.

Again referring to FIG. 1, any offset voltage generated by the input amplifier 21 is combined with the ANALOG SIGNAL being amplified. Three FET's are utilized in conjunction with the operational amplifier 21 to permit a low-cost operational amplifier to be utilized. An FET 90 has its source and drain electrode connected between the output 24 and the inverting input 23. Feedback for the input amplifier 21 is provided by a resistor 91 which is connected directly to the output 24 and is coupled through a capacitor 92 to the inverting input 23. An FET 93 couples the junction formed by the resistor 91 and the capacitor 92 to the amplifier common 25. Another FET 94 is connected across the analog signal transfer switch output terminals. Each gate electrode is coupled to a terminal 95 on the control circuit 37.

Conduction of the field effect transistors is controlled by a NAND circuit 96 as shown in FIG. 2. One input, ADDRESS, indicates that the analog-to-digital converter is being interrogated. It is present during phases one through four. During phase four, the return time required to complete phase three is read as a multiple character message. It may or may not be desirable to delay a changeover to the compensation mode depending upon other circuit considerations. Assume that a five-character code including C0, C1, C2, C3 and C4 is generated and that it is necessary to delay compensation until after C0 and C1 have been read out. C0 exists during phases one through four except during the transmission of C1 through C4. To accomplish this delay four inputs, ADDRESS, $\overline{C2}$, $\overline{C3}$, and $\overline{C4}$, are applied to the NAND circuit 96. The output of the NAND circuit 96 is coupled through an inverter 97 to a transistor 100 which, in conjunction with a resistive voltage divider 101, converts the logic signal to an output signal, $V_{OS-S}$, at the terminal 95. A low-impedance feedback path comprising the FET 90 couples the output 24 to the inverting input 23. If the amplifier 21 produces any offset, it appears as a voltage on the inverting input 23 and charges the capacitor to the offset value. Thereafter, when the voltage at the terminal 95 goes negative, the voltage on the capacitor 92 appears on the inverting input in series with the feedback voltage and thereby compensates for the offset voltage.

Therefore, the circuitry shown in FIGS. 1 and 2 is an embodiment of a compensating scheme which permits low-cost opreational amplifiers with unacceptable drift characteristics to be substituted in applications which heretofore have required expensive operational amplifiers. It will be obvious from this discussion that various aspects of this invention may be applied to numerous integrating amplifier systems and the application is not limited to the specific integrating amplifiers shown in FIG. 1. Furthermore, the manner of detecting integrating amplifier drift and the manner for controlling the application of a reference voltage to an inverting input is not limited to the specific embodiment shown. Therefore, it is an object of the appended claims to cover all such modifications and variations as come within the true spirit and scope of this invention.

What is claimed as new and desired to be secured by Letters Patent of the United States is:

1. An integrating circuit having integrating and standby operating modes comprising:

(a) an operational amplifier connected as an integrating amplifier and characterized by an undesirable drift voltage;

(b) a voltage source for generating positive and negative reference voltages;

(c) switching means selectively coupling the positive and negative reference voltages to the input of said operational amplifier;

(d) means generating an operating mode signal;

(e) means for sensing the output voltage polarity of said operational amplifier connected to the output thereof; and (f) control means responsive to simultaneous signals from said operating mode signal generating means and said output voltage sensing means to selectively close said switching means and apply the reference voltage to the input of said operational amplifier during the standby operating mode which voltage is the same polarity as the operational amplifier output voltage being compensated whereby the output voltage is maintained near zero during the standby operating mode.

2. An integrating circuit as recited in claim 1 wherein said operational amplifier has an inverting input, said control means being responsive to signals from said operating mode signal generating means and said output voltage sensing means to operate said switching means to apply a signal from said reference voltage source to said inverting input.

3. An integrating circuit as recited in claim 2 wherein the integrating operating mode includes a preparatory operating phase, an integrating operating phase and a read-out operating phase, said integrating circuit additionally including means for defining the phases and generating phase indication signals, said control means being responsive to preparatory and read-out operating phase signals to operate said switching means.

4. In an integrating circuit adapted for up-down integration including:

(a) an operational amplifier characterized by an internally generated offset voltage, said operational amplifier including an inverting input and capacitive feedback means and being adapted for integrating;

(b) comparator means responsive to said operational amplifier output voltage for generating a signal indicating the polarity of the output voltage of said amplifier;

(c) timing pulse generating means;

(d) voltage generating means for producing positive and negative reference voltages;

(e) timing means responsive to said timing pulse generating means for defining first, second, third, and fourth time periods;

(f) first switching means in series with said inverting input and adapted to couple an input signal to said operational amplifier;

(g) second switching means for selectively coupling one of asid reference voltages to said inverting input;

(h) control means responsive to said timing means to close said first switching means and open said second switching means during said second and third time periods, during said third time period in response to the output of said comparator means to close said switching means and apply a reference voltage to return the operational amplifier to zero, and during said first and fourth time periods to open said first switching means and operate said second switching means in response to the output of comparator means to maintain said operational amplifier output near zero and compensate for drift.

5. In an integrating circuit as recited in claim 4 additionally comprising an input operational amplifier characterized by an offset voltage including first and second feedback loops and switching means, a capacitor in common with both feedback loops, said switching means being responsive to said timing means during the first, third, and fourth time periods to energize said first feedback loop to couple said input amplifier output to ground through said capacitor to thereby charge said capacitor to the offset voltage, asid switching means being responsive to said control means in said second time period to energize said second feedback loop to thereby couple said input amplifier output to said inverting input through said capacitor whereby the offset voltage is applied to said inverting input to compensate for the offset voltage of said input amplifier.

References Cited

UNITED STATES PATENTS

| | | | |
|---|---|---|---|
| 3,267,458 | 8/1966 | Anderson et al. | 340—347 |
| 3,368,149 | 2/1968 | Wasserman | 340—347 X |
| 3,374,362 | 3/1968 | Miller | 328—127 X |
| 3,413,561 | 11/1968 | Hogan | 330—9 |
| 3,422,424 | 1/1969 | Belet | 340—347 |
| 3,436,756 | 4/1969 | Myers et al. | 340—347 |

MALCOLM A. MORRISON, Primary Examiner

F. D. GRUBER, Assistant Examiner

U.S. Cl. X.R.

235—150.51; 328—127, 151; 330—9